United States Patent

Hiruma

[15] 3,651,735
[45] Mar. 28, 1972

[54] VIEW-FINDER FOR SINGLE LENS REFLEX CAMERAS

[72] Inventor: Kenji Hiruma, Tokyo, Japan
[73] Assignee: Ricoh Co., Ltd., Tokyo, Japan
[22] Filed: July 20, 1970
[21] Appl. No.: 56,511

[52] U.S. Cl. .................................88/1.5 R, 95/11 V, 95/42
[51] Int. Cl. .......................................G03b 13/00, G03b 19/12
[58] Field of Search................95/11 V, 42, 44 R; 88/1.5 R

[56] References Cited

UNITED STATES PATENTS 3,052,169   9/1962   Papke..................................88/1.5 X

FOREIGN PATENTS OR APPLICATIONS 741,844    11/1943   Germany...................................95/42
166,197    6/1950    Austria....................................88/1.5
1,002,614  2/1957    Germany...................................95/42
237,554    12/1964   Austria....................................95/42

Primary Examiner—Ronald L. Wibert
Assistant Examiner—F. L. Evans
Attorney—Henry T. Burke, Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd

[57] ABSTRACT

Viewfinder system, for single-lens reflex cameras, which permits viewing both at eye level, and waist or chest level, and comprises a pentagonal roof-type reflecting mirror assembly (similar in function to the conventional penta-prism), whose second reflecting mirror or surface is pivotally mounted, so that it may be switched between two positions. This second reflecting surface, which may be pivoted about its center or an edge, in one position redirects the beam of light from the camera lens system toward an eye-level finder lens while in the other position it redirects the beam toward a waist or chest-level finder lens.

3 Claims, 2 Drawing Figures

PATENTED MAR 28 1972 3,651,735

INVENTOR
KENJI HIRUMA

BY Henry P. Burk
ATTORNEY

VIEW-FINDER FOR SINGLE LENS REFLEX CAMERAS

BACKGROUND OF THE INVENTION

The present invention relates generally to viewfinders for single-lens reflex cameras and more particularly to a viewfinder which may be used at either eye level or waist or chest-level.

In some single-lens reflex cameras, the penta-prism viewfinders for eye-level shots are removably attached to the cameras so that when the penta-prisms are detached, the cameras may be used at waist or chest-level. Such systems have a distinct disadvantage in that the viewfinder optical system tends to become contaminated by fingerprints and the like when the prism is detached. Furthermore, it is often difficult to incorporate in the camera an associated system for exposure setting because these combined systems are very complex in construction. There is known a waist or chest-level viewfinder attachable to the penta-prism viewfinder, but the brightness of the image and the angle of view obtained with this viewfinder are not satisfactory because of optical design restrictions. It is also inconvenient to attach or detach the viewfinder whenever the camera is to be used at eye-level or waist or chest-level.

The present invention provides an improved viewfinder for single-lens reflex cameras, which may be used both at eye-level and waist or chest-level, and which is simple in construction and operation so that it may be immediately switched from an eye-level viewfinder to a waist or chest-level viewfinder in one simple operation and vice versa.

SUMMARY OF THE INVENTION

The present invention comprises a pentagonal roof-type reflecting mirror assembly having two reflecting mirrors or surfaces (as in a conventional penta-prism, thus producing a 90° deviation of an entering beam of light); the second reflecting mirror or surface of which is pivotally mounted so that the beam of light redirected toward it by the first reflecting mirror or surface may be selectively redirected toward an eye-level viewfinder lens system or toward a waist or chest-level viewfinder lens system. Thus, the pivotally hinged second reflecting mirror or surface may be simply and quickly switched from one position to another, so that the camera may be immediately used at eye-level or waist or chest-level without the need for detaching the penta-prism or attaching a waist or chest-level viewfinder, as required by the prior art. Since the pentagonal roof-type reflecting mirror assembly may be securely fixed to the camera, any associated system for exposure setting may be incorporated in a simple manner.

The above and and other advantages of the present invention will become more apparent from the following description of the preferred embodiments thereof taken in conjunction with the accompanying drawing.

DESCRIPTION OF THE PREFERRED EMBODIMENTS

Figure 1:
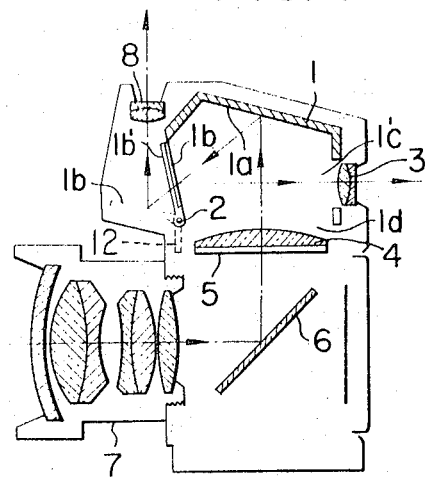
FIG. 1 is a sectional view of a first embodiment of the present invention.

The lens system of the present invention, as shown in FIG. 1 comprises a pentagonal roof-type reflecting-mirror assembly 1, which may be of an appropriate plastic and of unitary construction, and which is similar in configuration to the conventional penta-prism. The assembly has two reflecting mirrors or surfaces 1a and 1b with a light entrance 1d and exit 1c. The second reflecting mirror 1b is attached to a wall 1b' which is mounted on a shaft 2 rotatably supported in the interior of the camera 10. It is seen that the reflecting mirror 1b may be pivoted between two positions about the axis of the shaft 2, which is located at the lower side edge of the wall 1b'. An eye-level viewfinder lens system 3 is disposed adjacent to the exit 1c of the pentagonal roof-type reflecting-mirror assembly 1. A condenser lens 4 and a ground glass 5 are disposed immediately below the entrance 1d, and a movable or deviating mirror 6 of conventional construction is disposed below the ground glass 5.

Now, when the second reflecting mirror 1b is in the position indicated by the solid lines in FIG. 1, that is, in the eye-level position, the beam of light 11, entering through the image focusing lens system 7 of the camera, is redirected by the movable mirror 6 and the first and second reflecting mirrors 1a and 1b toward the eye-level viewfinder lens system 3 as indicated by the arrows. This is substantially similar to the operation of the conventional single-lens reflex camera having a conventional penta-prism viewfinder. However, when the reflecting mirror 1b or wall 1b' is rotated in the counter-clockwise direction to the position indicated by the imaginary lines in FIG. 1, the beam of light 11, reflected by the first reflecting mirror 1a is redirected by the second reflecting mirror 1b substantially perpendicular to the optical axis of the photographic lens system 7 toward a waist or chest-level viewfinder lens system 8 which is disposed above the reflecting mirror 1b at the top of the camera 10. Thus, it will be seen that an operator by merely pivoting the reflecting mirror 1b between the two positions by suitable means, such as a simple lever 12 connected to the shaft 2, can immediately switch the lens assembly 1 from operation as an eye-level viewfinder to a waist or chest-level viewfinder and vice versa.

Figure 2:
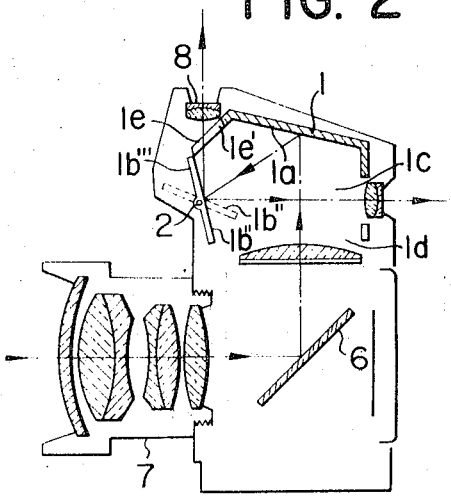
FIG. 2 is a sectional view of a second embodiment of the present invention.

FIG. 2 shows an alternate embodiment of the present invention in which the second reflecting mirror 1b″ or the wall 1b‴ is pivotally mounted at its mid-portion on a shaft 2′. This arrangement provides the advantage that the extension of the top of the second reflecting mirror 1b″, at the waist or chest-level viewing position, into the front of the camera 10 may be reduced as compared with the first embodiment (FIG. 1), so that the overall viewfinder optical system may be designed more compactly in size. In order to permit this reduction, in the latter embodiment, an opening 1e′ is formed through wall 1e between the first and second reflecting mirrors 1a and 1b″ so that the beam of light redirected by the second reflecting mirror 1b″ may pass through and reach the waist or chest-level viewfinder lens system 8. The viewfinder of the latter embodiment may of course, also be readily switched and used for eye-level and waist or chest-level viewing.

What is claimed is:

1. In a single lens reflex camera of the type which can be used at eye level and waist or chest level and comprising an objective lens system and pentagonal roof-type reflecting-mirror assembly of the type having:
   a. a first reflecting surface;
   b. a second reflecting surface positioned to receive light reflected from said first reflecting surface;
   c. a light entrance disposed opposite said first reflecting surface and two light exits,
   d. an eye-level finder lens system disposed adjacent to one of said light exits and in opposed relation with said second reflecting surface,
   e. a waist or chest-level finder lens system disposed adjacent to the other of said light exits and upwardly of said second reflecting surface wherein the improvement comprises:
   f. hinge means for mounting said second reflecting surface for switching between two positions; and
   g. means for switching said second reflecting surface between said two positions, whereby, when said second reflecting surface is in one of said two positions, beams of light from said first reflecting surface are reflected toward said eye-level finder lens system by said second reflecting surface while, when said second reflecting surface is in the other of said two positions, said beams are reflected toward said waist or chest-level finder lens system by said second reflecting surface.

2. A viewfinder as in claim 1, wherein
   a. said second reflecting surface is rotatably hinged at its midportion; and comprising b. a wall between said first and second reflecting surfaces of said pentagonal roof-type reflecting mirror assembly having an opening for passing the beams reflected by said second reflecting surface toward said waist or chest-level finder lens system.

3. A viewfinder as in claim 1, wherein said second reflecting surface is rotatably hinged at its lower edge.

* * * * *